(12) United States Patent
Goto

(10) Patent No.: US 8,806,614 B2
(45) Date of Patent: Aug. 12, 2014

(54) IMAGE PROCESSING APPARATUS, CONTROLLING METHOD OF IMAGE PROCESSING APPARATUS, AND COMPUTER PROGRAM

(75) Inventor: Tomoyo Goto, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 104 days.

(21) Appl. No.: 13/224,381

(22) Filed: Sep. 2, 2011

(65) Prior Publication Data

US 2012/0072981 A1    Mar. 22, 2012

(30) Foreign Application Priority Data

Sep. 22, 2010  (JP) ................................ 2010-212090

(51) Int. Cl.
| | | |
|---|---|---|
| G06F 7/04 | (2006.01) | |
| G06F 12/00 | (2006.01) | |
| G06F 12/14 | (2006.01) | |
| G06F 13/00 | (2006.01) | |
| G06F 17/30 | (2006.01) | |
| G11C 7/00 | (2006.01) | |

(52) U.S. Cl.
USPC ............ 726/19; 358/1.14; 713/155; 713/184; 726/7

(58) Field of Classification Search
USPC .......... 358/1.14, 1.15, 1.16; 705/51; 713/155, 713/182, 185; 715/733; 726/2, 5, 7, 19
See application file for complete search history.

(56) References Cited

U.S. PATENT DOCUMENTS

| | | | | |
|---|---|---|---|---|
| 5,367,150 | A  * | 11/1994 | Kitta et al. ..................... | 235/380 |
| 2007/0091346 | A1* | 4/2007 | Ogura et al. ................. | 358/1.14 |
| 2007/0234429 | A1* | 10/2007 | Mizutani ......................... | 726/26 |
| 2008/0051986 | A1* | 2/2008 | Amano et al. ................ | 701/200 |
| 2009/0235341 | A1* | 9/2009 | Hashimoto ....................... | 726/5 |
| 2010/0238487 | A1* | 9/2010 | Sekiya ......................... | 358/1.15 |
| 2010/0332823 | A1* | 12/2010 | Tsujimoto .................... | 713/155 |
| 2012/0272299 | A1* | 10/2012 | Ikeuchi ............................ | 726/5 |

FOREIGN PATENT DOCUMENTS

JP    2008-134857    6/2008

OTHER PUBLICATIONS

NEC, Multifunction Printer Access Control, Jun. 2008.*
M. Abadi et al., Authentication and Delegation with Smart-cards, Jul. 30, 1992.*

* cited by examiner

Primary Examiner — Andrew Nalven
Assistant Examiner — Huan V Doan
(74) Attorney, Agent, or Firm — Fitzpatrick, Cella, Harper & Scinto

(57) ABSTRACT

In a case where a plurality of users are made correspondent to one IC card, user changeover is performed without a logout process. When the IC card is passed over a card reader while a user is logging in, it is judged whether or not the passed card is the IC card used in a login process of the user who is logging in. If NO, a logout process of the user who is logging in is performed, and a user login process using the newly passed IC card is performed. On the other hand, if YES, it is further judged whether or not the plurality of users are made correspondent to the passed IC card. If YES, selection of the user who intends to newly log in is accepted.

7 Claims, 10 Drawing Sheets

FIG. 8

| CARD INFORMATION | USER INFORMATION ||||
|---|---|---|---|---|
| | USER NAME | PASSWORD | MAIL ADDRESS | ⋯ |
| 4fkgods9fmkd | USER1 | 12323 | USER1@mail.co.jp | ⋯ |
| 4fkgods9fmkd | USER2 | password | USER1@mail.co.jp | ⋯ |
| 4fkgods9fmkd | USER3 | password | USER1@mail.co.jp | ⋯ |
| zkg94mfks093 | USER4 | 09090 | USER4@mail.co.jp | ⋯ |
| skfor3945860 | USER5 | Oo0998 | USER5@mail.co.jp | ⋯ |
| skfor3945860 | USER6 | Oo0998 | USER5@mail.co.jp | ⋯ |
| 5dfkgo3049sl | USER7 | 45eeif | USER7@mail.co.jp | ⋯ |
| ⋮ | ⋮ | ⋮ | ⋮ | ⋮ |

FIG. 9

| USER NAME | JOB NAME | NUMBER OF PRINTS | STORAGE DATE AND TIME | PRINT DATA |
|---|---|---|---|---|
| USER 1 | MINUTES.doc | 1 | 2010/08/31 10:31 | ¥¥PRINT SERVER 1¥STORAGE¥0001.prn |
| USER 1 | TRAINING MATERIAL.ppt | 5 | 2010/08/31 10:40 | ¥¥PRINT SERVER 1¥STORAGE¥0005.prn |
| USER 2 | TRAINING MATERIAL.ppt | 1 | 2010/08/31 10:43 | ¥¥PRINT SERVER 2¥STORAGE¥0010.prn |
| USER 4 | TRAINING MATERIAL.ppt | 1 | 2010/08/31 10:56 | ¥¥PRINT SERVER 2¥STORAGE¥0011.prn |
| USER 6 | TRAINING MATERIAL.ppt | 1 | 2010/08/31 11:01 | ¥¥PRINT SERVER 3¥STORAGE¥0121.prn |
| ...... | ...... | ...... | ...... | ...... |

PASS IC CARD OVER CARD READER

SELECT LOGIN USER NAME
AND DEPRESS LOGIN BUTTON

- ✓ administrator
- subUser1
- subUser2
- subUser3
- subUser4

LOGIN

IMAGE PROCESSING APPARATUS, CONTROLLING METHOD OF IMAGE PROCESSING APPARATUS, AND COMPUTER PROGRAM

BACKGROUND OF THE INVENTION

1. Field of the Invention

The present invention relates to a technique for authenticating a user who uses an apparatus such as an image processing apparatus or the like, and more particularly to a technique for performing user authentication using an IC card.

2. Description of the Related Art

In a case where an image forming apparatus such as a multifunction machine or the like is used, a technique for specifying a user who intends to use the apparatus by performing user authentication, and thus causing the specified user to actually use the apparatus is widely performed.

For example, there is a printing method by which, to ensure security of print data, the print data generated by a printer driver as a result of a print instruction issued on a computer is once stored in a memory of a server apparatus or an image forming apparatus, and then a printing process is started when it is instructed to print the stored print data. Here, in the case where the print data is stored in the memory of the server apparatus or the image forming apparatus, user information is stored together with the print data, and then the printing process of the print data which has been made correspondent to the user specified as the result of the user authentication performed in the image forming apparatus is started. By doing so, it is possible to decrease the risk that the printing process is performed by the image forming apparatus immediately after the print instruction was issued and thus the printed result is unwillingly seen by anyone else (that is, the person who is different from the person who instructed the printing process).

Further, when the image forming apparatus is used, the user who uses the apparatus is specified by the user authentication. Thus, it is possible to have history information indicating what kind of setting has been performed to each user, and it is also possible to charge each section for use of the image forming apparatus in accordance with the history information.

In any case, Japanese Patent Application Laid-Open No. 2008-134857 discloses a technique for specifying a user who intends to use an image forming apparatus by user authentication, and then permitting the specified user to actually use the image forming apparatus. More specifically, in Japanese Patent Application Laid-Open No. 2008-134857, when the user authentication is performed using an IC card, in a case where an IC card of another user (second user) is passed over a card reader while a certain user (first user) is logging in to the image forming apparatus, a logout process is performed to the user who is logging in, and the authentication process using the newly passed IC card is performed. By doing so, for example, even when the certain user (first user) does not perform a logout process after he/she used the image forming apparatus, it is unnecessary for another user (second user) to perform the logout process for the certain user (first user), thereby improving operability.

However, recently, a plurality of IDs (user information) are made correspondent to one IC card, for the reason that, for example, the charge of a fee necessary to user the image forming apparatus is calculated not for the section to which users belong but for a business such as a certain project or the like to which users relate.

Consequently, the IDs corresponding to the businesses to which the users respectively relate have been registered in the one IC card that these users commonly own. Then, in case of using the image forming apparatus, the authentication using the IC card is performed, the user information corresponding to the business is selected from the plurality of IDs made correspondent to the IC card, and the user corresponding to the selected user information actually uses the image forming apparatus. By doing so, it is possible to calculate the charge of the fee necessary to use the image forming apparatus for each project.

At this time, to change over the users registered in the same IC card, it is necessary to once perform the logout process for the user who is logging in to the image forming apparatus and then perform again the user authentication process. Such a process can be avoided by changing over the users registered on the same IC card. However, in this case, somebody else can instruct and perform the printing of the print data made correspondent not only to the user who has logged in but also to the plurality of users who share the IC card used at the time of the login (at the time of the user authentication). Such a situation is undesired from the viewpoint of security.

Further, even in the case where the invention disclosed in Japanese Patent Application Laid-Open No. 2008-134857 is applied, the logout process is unnecessary when a different IC card is used, but the user changeover process is not started when the same IC card is passed over the card reader. As a result, it is necessary to perform again the login process after the logout process was performed.

SUMMARY OF THE INVENTION

The present invention has been completed in consideration of the above-described problems, and an object of the present invention is to provide an authentication apparatus in which a user changeover process can be performed without a manual logout process even in a case where a plurality of users are made correspondent to a same card, an authentication method which is applicable to the authentication apparatus, and a program which is applicable to the authentication method.

To achieve the above object, according to one aspect of the present invention, there is provided an image processing apparatus comprising: an obtaining unit configured to obtain an ID stored in an external storage medium; a displaying unit configured to display, in a case where the ID obtained by the obtaining unit is made correspondent to a plurality of users, a screen for selecting one of the plurality of users; an accepting unit configured to accept login by the user selected on the displayed screen; and a controlling unit configured to cause, in a case where the ID is obtained from the external storage medium by the obtaining unit while the login to the image processing apparatus by the user is being accepted by the accepting unit, the displaying unit to display the screen.

Further, according to another aspect of the present invention, there is provided a controlling method of an image processing apparatus, comprising: obtaining an ID stored in an external storage medium; displaying, in a case where the obtained ID is made correspondent to a plurality of users, a screen for selecting one of the plurality of users on a displaying unit; accepting login by the user selected on the displayed screen; and controlling, in a case where the ID is obtained from the external storage medium while the login to the image processing apparatus by the user is being accepted, the displaying unit to display the screen.

According to the present invention, it is possible to properly change over the plurality of users without manually performing the logout process even in the case where the plurality of IDs are registered on the same IC card.

Further, in a case where the user who is logging in is changed over to another user registered on the same IC card, it is necessary to actually user the relevant IC card. Consequently, it is possible to prevent that a user who does not have the IC card changes over the user who is logging in.

Further features of the present invention will become apparent from the following description of exemplary embodiments with reference to the attached drawings.

BRIEF DESCRIPTION OF THE DRAWINGS

FIG. 8 is a view illustrating an example of a data constitution of a user authentication table stored in an external memory 211 of the authentication server 102.

FIG. 9 is a view illustrating an example of a data constitution of a bibliographic information data table stored in an external memory 211 of the print management server 105.

DESCRIPTION OF THE EMBODIMENTS

Preferred embodiments of the present invention will now be described in detail in accordance with the accompanying drawings.

Figure 1:
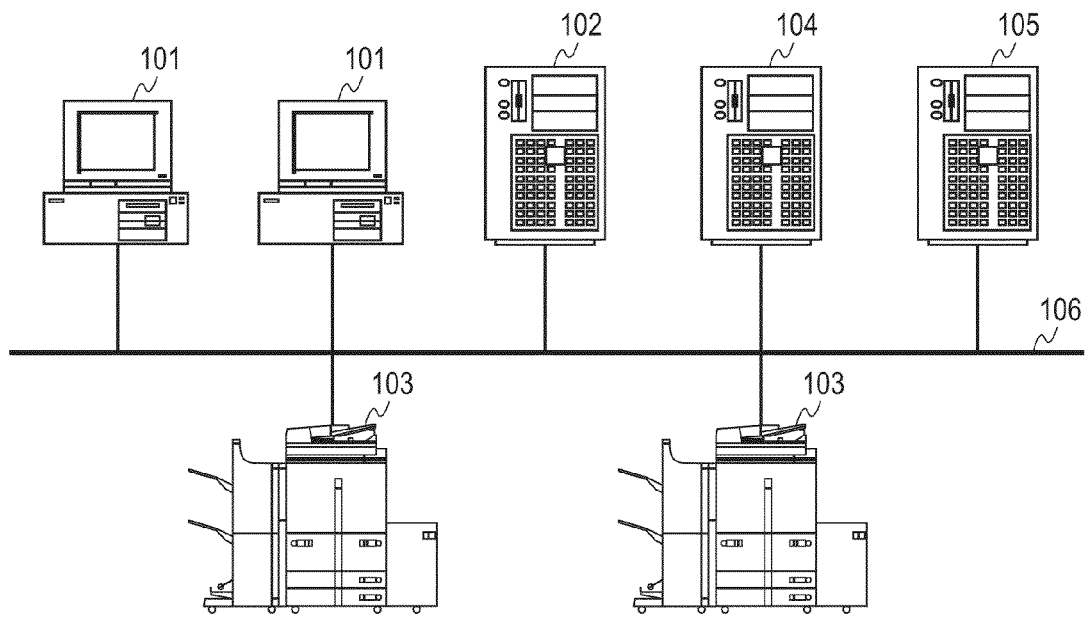
FIG. 1 is a schematic diagram illustrating an example of a system configuration according to an embodiment of the present invention.

FIG. 1 is a schematic diagram illustrating an example of an image processing system according to one embodiment of the present invention. As illustrated in FIG. 1, the image processing system has the configuration in which, for example, one or a plurality of client apparatuses (client PCs (personal computers)) 101, an authentication server 102, one or a plurality of multifunction machines (image forming apparatuses) 103, one or a plurality of print servers 104, and a print management server 105 are mutually connected to others through a LAN (local area network) (communication medium) 106.

A printer driver has been installed in the client PC 101. Thus, it is possible by the installed printer driver to generate print data based on data received from an application program, transmit the generated print data to the print server 104, and store the transmitted print data to a predetermined storage location (spool region) of the print server 104.

A later-described user authentication table (FIG. 8) has been stored in the authentication server 102. Thus, an authentication process is performed using the information on the user authentication table according to an authentication request by the card information transmitted from the multifunction machine 103.

The card information read by the card reader is transmitted as the authentication request from the multifunction machine 103 to the authentication server 102. Further, a screen to be displayed is controlled by the multifunction machine 103, based on the user information specified by the user authentication based on the card information in the authentication server 102. Further, in accordance with a user operation instruction, a request command is transmitted to the print server 104 so as to output the print data stored in the print server 104 according to an LPR (Line PRinter daemon protocol), and the received print data is output and printed by the print server 104 according to the request command.

Further, bibliographic information data corresponding to the print data received from the client PC 101 is generated by the print server 104, the generated bibliographic information data is transmitted to the print management server 105, and the transmitted bibliographic information data can be stored at a predetermined storage location in the print management server 105.

Furthermore, it is controlled by the print server 104 to transmit the print data stored at the predetermined storage location to the designated multifunction machine 103 based on the command for performing the LPR received from an external apparatus (for example, the multifunction machine 103).

A bibliographic information data table (illustrated in later-described FIG. 9) is provided in the print management server 105. Namely, bibliographic information (that is, bibliographic information for the print data stored in the print server 104) transmitted from the print server 104 is received, and the received information is stored and managed on the bibliographic information data table.

The LAN 106 is the network for communicably connecting the above-described apparatuses mutually in either a wired manner or a wireless manner. This is the example of the image processing system according to the present invention.

Subsequently, a hardware constitution of an information processing apparatus, which is applicable to each of the client apparatus 101, the authentication server 102, the print server 104 and the print management server 105 respectively illustrated in FIG. 1, will be described with reference to FIG. 2. Incidentally, FIG. 2 indicates an example of the hardware constitution of the client apparatus 101.

Figure 2:
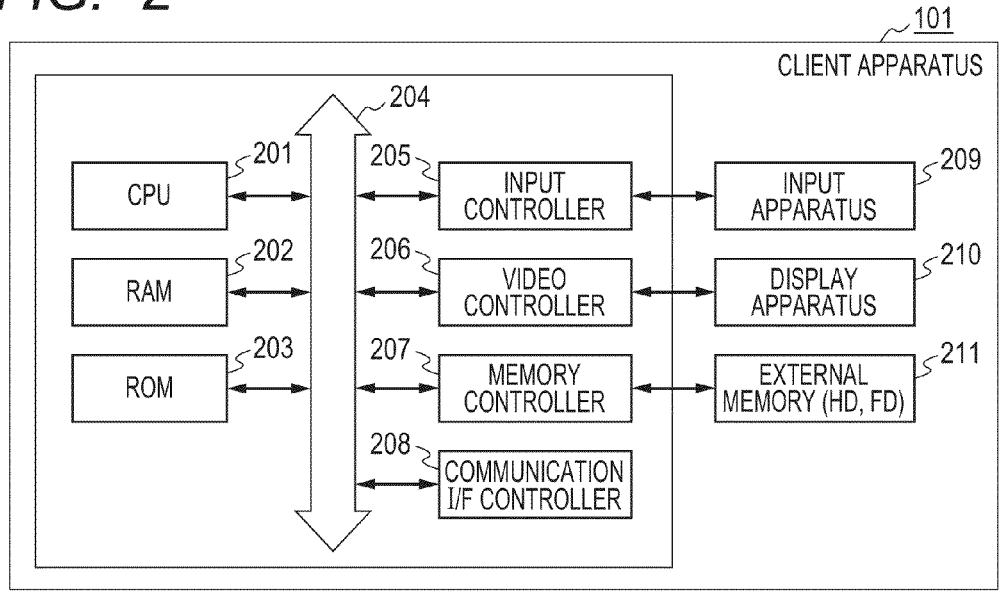
FIG. 2 is a block diagram illustrating an example of a hardware constitution of a computer which is applicable to a client apparatus 101, an authentication server 102, a print server 104 and a print management server 105.

In FIG. 2, a CPU (central processing unit) 201 totally controls devices and controllers respectively connected to a system bus 204. Incidentally, BIOS (Basic Input/Output System) serving as a control program for the CPU 201, an OS (operating system) also serving as a control program, later-described various programs necessary to achieve functions to be performed by the client apparatus, the server and the like, and the like are stored in a ROM (read only memory) 203 or an external memory 211.

A RAM (random access memory) 202 serves as a main memory, a working area and the like for the CPU 201. In case of performing a process, the CPU 201 loads a program or the like necessary for the process from the ROM 203 or the external memory 211 to the RAM 202, and then executes the loaded program or the like to perform the process.

An input controller 205 controls inputs from an input apparatus 209 such as a keyboard, a pointing device or the like. A video controller 206 controls display to be performed on a display device such as a display apparatus 210 or the like. In any case, these controllers are used by an operator as necessary.

A memory controller 207 controls access to an HD (hard disk), an FD (flexible disk), or the external memory 211 such as a CompactFlash™ memory or the like connected to a PCMCIA (Personal Computer Memory Card International Association) card slot through an adapter, which stores a boot program, various applications, font data, user files, edit files, various data and the like.

A communication I/F (interface) controller 208, which connects to and communicates with an external apparatus through a network (for example, the LAN 106 illustrated in FIG. 1), performs a communication control process on the network. For example, the communication I/F controller 208 can perform communication using a TCP/IP (Transmission Control Protocol/Internet Protocol), or the like.

Incidentally, the CPU 201 enables display on the display apparatus 210 by performing, for example, an extracting (rasterizing) process of an outline font to a display information region in the RAM 202. Further, the CPU 201 enables a user instruction using a not-illustrated mouse cursor or the like on the display apparatus 210.

It should be noted that processes in respective steps illustrated in later-described flow charts for achieving the present invention are performed by programs which can be read and executed by a computer, and these programs have been stored and recorded in the external memory 211. Then, these programs are loaded to the RAM 202 as necessary, and the loaded programs are executed by the CPU 201. Further, definition files, various information tables and the like to be used when the programs are executed have been stored in the external memory 211, and these files and tables will be later described in detail.

Subsequently, a hardware constitution of the multifunction machine 103 illustrated in FIG. 1 will be described with reference to FIG. 3. Namely, FIG. 3 is the block diagram illustrating an example of the hardware constitution of the multifunction machine 103 illustrated in FIG. 1.

Figure 3:
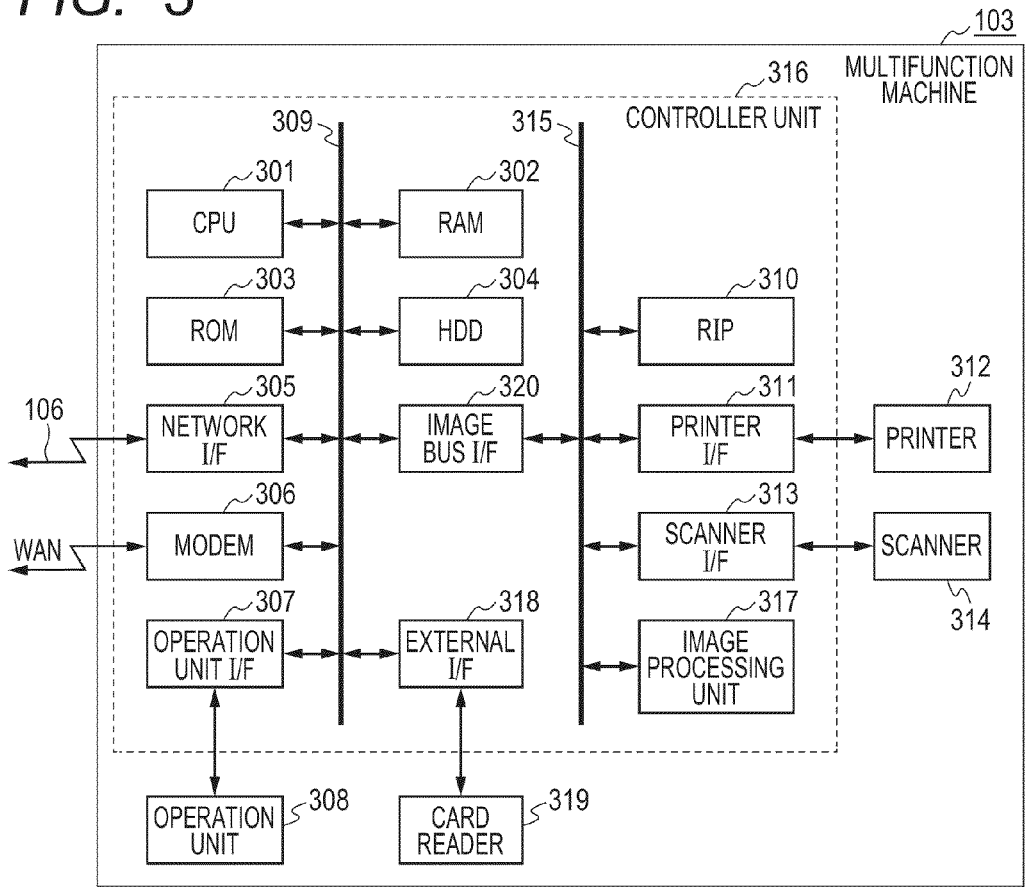
FIG. 3 is a block diagram illustrating an example of a hardware constitution of a multifunction machine 103.

In FIG. 3, a controller unit 316 is connected to a scanner 314 serving as an image input device and a printer 312 serving as an image output device, and also connected to a LAN (for example, the LAN 106 illustrated in FIG. 1) and a public line (WAN (wide area network)) (e.g., a PSTN (public switched telephone network), an ISDN (Integrated Services Digital Network)), thereby inputting and outputting image data and device information.

In the controller unit 316, a CPU 301 is the processor which wholly controls the system. A RAM 302 is the system working memory to be used when the CPU 301 operates. Also, the RAM 302 serves as a program memory for recording programs and an image memory for temporarily storing image data.

A ROM 303 stores therein a boot program and various control programs for the system. An HDD (hard disk drive) 304 stores therein various programs for controlling the system, image data, and the like.

An operation unit I/F 307 is the interface unit for an operation unit 308. Further, the operation unit I/F 307 functions to transfer key information (e.g., start button depression) input from the operation unit 308 to the CPU 301.

A network I/F 305, which is connected to the network such as the LAN 104 or the like, inputs and outputs data. A modem 306, which is connected to the WAN, inputs and outputs facsimile transmission and reception data.

An external I/F 318 is the interface unit which accepts external inputs such as inputs from as a USB (universal serial bus), an IEEE (Institute of Electrical and Electronics Engineers) 1394, a printer port, an RS-232C (Recommended Standard 232 version C), or the like. In the present embodiment, a card reader 319 for reading a non-contact IC card (storage medium) necessary for the user authentication is connected to the external I/F 318. Then, the CPU 301 controls information reading from the IC card by the card reader 319 through the external I/F 318, whereby it is possible to obtain the information read from the IC card. The above-described devices are disposed on a system bus 309.

An image bus I/F 320 is the bus bridge which connects the system bus 309 to an image bus 315 for transferring image data at high speed, and thus converts a data structure. The image bus 315 is constituted by a PCI (Peripheral Component Interconnect) bus or an IEEE 1394 bus. Here, the following devices are disposed on the image bus 315.

An RIP (raster image processor) 310 extracts, for example, vector data such as a PDL (page description language) code or the like into a bit map image. A printer I/F 311 connects the printer 312 and the controller unit 316 to each other, and thus performs synchronous/asynchronous conversion for image data. A scanner I/F 313 connects the scanner 314 and the controller unit 316 to each other, and thus performs synchronous/asynchronous conversion for image data.

An image processing unit 317 performs correction, processing and editing for input image data, and performs printer correction, resolution conversion and the like for print output image data. In addition, the image processing unit 317 performs image data rotation, compression and extraction processes to multivalued image data according to a JPEG (Joint Photographic Experts Group) format, and compression and extraction processes to binary image data according to a JBIG (Joint Bi-level Image experts Group), MMR (Modified Modified READ (Relative Element Address Designate)) or MH (Modified Huffman) format. Further, the image processing unit 317 can drive the scanner 314 to perform an image process for the image data obtained by image reading, convert the processed image data to have a format capable of being file-output (e.g., a PDF format file), and transmit the image data file to the external apparatus through the network I/F 305 in cooperation with the CPU 301.

The scanner 314 converts an image on a paper original into an electrical signal as raster image data, by irradiating the image and then scanning it with a CCD (charge-coupled device) line sensor. After the paper original was set on a tray of a document feeder, when a reading start instruction by the user of the apparatus is issued from the operation unit 308, the CPU 301 instructs the scanner 314 to cause the document feeder to feed and read the paper original one by one.

The printer 312 is the unit for converting the raster image data into an image on a paper, in an electrophotographic method using a photosensitive drum, a photosensitive belt or the like, an inkjet method of directly printing the image on the paper by discharging or emitting inks from a micro-nozzle array, or the like. Such a print operation is started in response to an instruction issued from the CPU 301. Incidentally, it should be noted that the printer 312 has a plurality of paper feeding stages for enabling the user to select different paper sizes and/or different paper directions, and a plurality of paper cassettes respectively corresponding to the plurality of paper feeding stages.

The operation unit 308 has an LCD unit which has a touch panel sheet thereon to display the system operation screen, and transfers, when the displayed key is depressed, position information indicating the position of the depressed key to the CPU 301 through the operation unit I/F 307. Here, the operation keys provided on the operation unit 308 include, for example, a start key, a stop key, an ID key, a reset key, and the like.

Here, the start key on the operation unit 308 is used to start, for example, a reading operation of an original image. Two LEDs (light-emitting diodes) consisting of green and red LEDs are provided at the center of the start key, so as to indicate based on a color thereof whether the start key is in a usable state. The stop key on the operation unit 308 is used to stop the operation which is being performed, the ID key on the operation unit 308 is used to input the user ID of the user and manually perform the logout process of the user, and the reset key is used to initialize the setting from the operation unit.

Under the control of the CPU 301, the card reader 319 reads the information stored in the non-contact IC card, and notifies the CPU 301 of the read information through the external I/F 318.

By the above constitution, the multifunction machine 103 can transmit the image data read from the scanner 314 to the LAN 104, and also print-output the print data received from the LAN 104 by the printer 312.

Moreover, the multifunction machine can facsimile-transmit the image data read from the scanner 314 to the WAN through the modem 306, and output the image data facsimile-received from the WAN by the printer 312.

Subsequently, a user authentication process to be performed when the multifunction machine 103 is used will be described with reference to FIG. 4. It should be noted that the user authentication process is the process which is performed by the CPU 301 of the multifunction machine 103 and the CPU 201 of the authentication server 102.

Figures 10, 11:
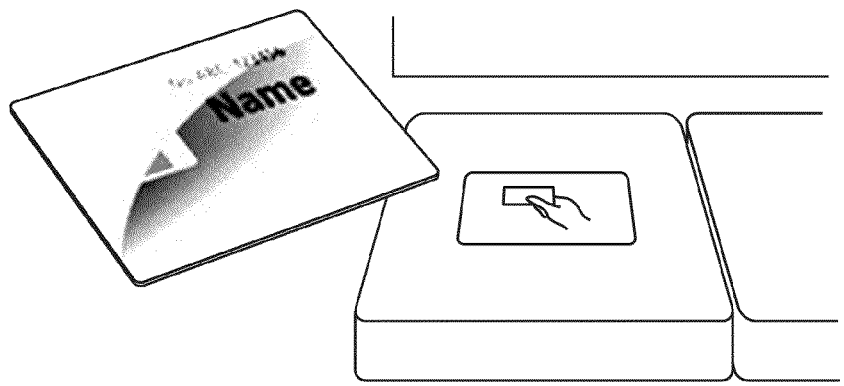
FIG. 10 is a view illustrating an example of an authentication screen to be displayed on an LCD (liquid crystal display) unit of an operation unit 308 of the multifunction machine 103.
FIG. 11 is a view illustrating an example of a login user selection screen to be displayed on the LCD unit of the operation unit 308 of the multifunction machine 103.

Initially, an authentication screen 1000 illustrated in FIG. 10 is displayed on the LCD unit of the operation unit 308 by the CPU 301 of the multifunction machine 103, so as to cause the user who uses the multifunction machine 103 to perform the user authentication by the IC card (step S401). Then, a polling start request is transmitted to the card reader 319, and thus polling is started by the card reader 318 (step S402). Subsequently, when it is detected that the IC card is passed over the card reader 318 (step S403), the card information of the passed IC card is obtained by the card reader 318, and the obtained card information is transmitted to the multifunction machine 103 (card information obtaining: step S404). Then, authentication request data including the card information obtained in the step S404 is generated and then transmitted to the authentication server by the CPU 301 of the multifunction machine 103, whereby the authentication server 102 is requested to perform the user authentication using the obtained IC card information (step S405).

When the authentication request data from the multifunction machine 103 is received by the CPU 201 of the authentication server 102 (step S421), the user authentication is performed using the user authentication table stored in the external memory 211 (step S422).

Here, a data constitution of a user authentication table 800 stored in the external memory 211 of the authentication server 102 will be described with reference to FIG. 8. Namely, FIG. 8 is the view illustrating an example of the data constitution of the user authentication table 800.

As illustrated in FIG. 8, the user authentication table 800 includes a card information 801 and a user information 802 as data items, and further includes a user name 802-1, a password 802-2, a mail address 802-3 and the like as the user information 802.

Here, the card information 801 is the data item to which the card information of the IC card that the user has is registered. The user information 802 is the data item to which the information concerning the user who has the IC card is registered.

The user name 802-1 is the data item to which the user name of the user who has the IC card is registered. The password 802-2 is the data item to which the password to be used in the authentication process when the IC card was lost is registered. That is, when the IC card is lost, the user inputs the user name and the password to the multifunction machine 103 as the authentication information. Thus, the user authentication request using the user name and the password is transmitted from the CPU 301 of the multifunction machine 103 to the authentication server 102. Further, the mail address 802-3 is the data item to which the mail address of the user who has the IC card is registered.

In a case where a plurality of users are tied to one IC card, a plurality of records respectively having the same information as the card information 801 are registered on the user authentication table.

In the card authentication process, the authentication server 102 performs the actual authentication process by judging in which card information 801 registered on the user authentication table 800 the IC card information included in the authentication request data received from the multifunction machine 103 has been registered. More specifically, the user who has the record in which the card information included in the authentication request data has been registered in the card information 801 is specified as the user who logs in to the multifunction machine 103. As above, the data configuration on the user information table 800 illustrated in FIG. 8 has been described.

Figure 4:
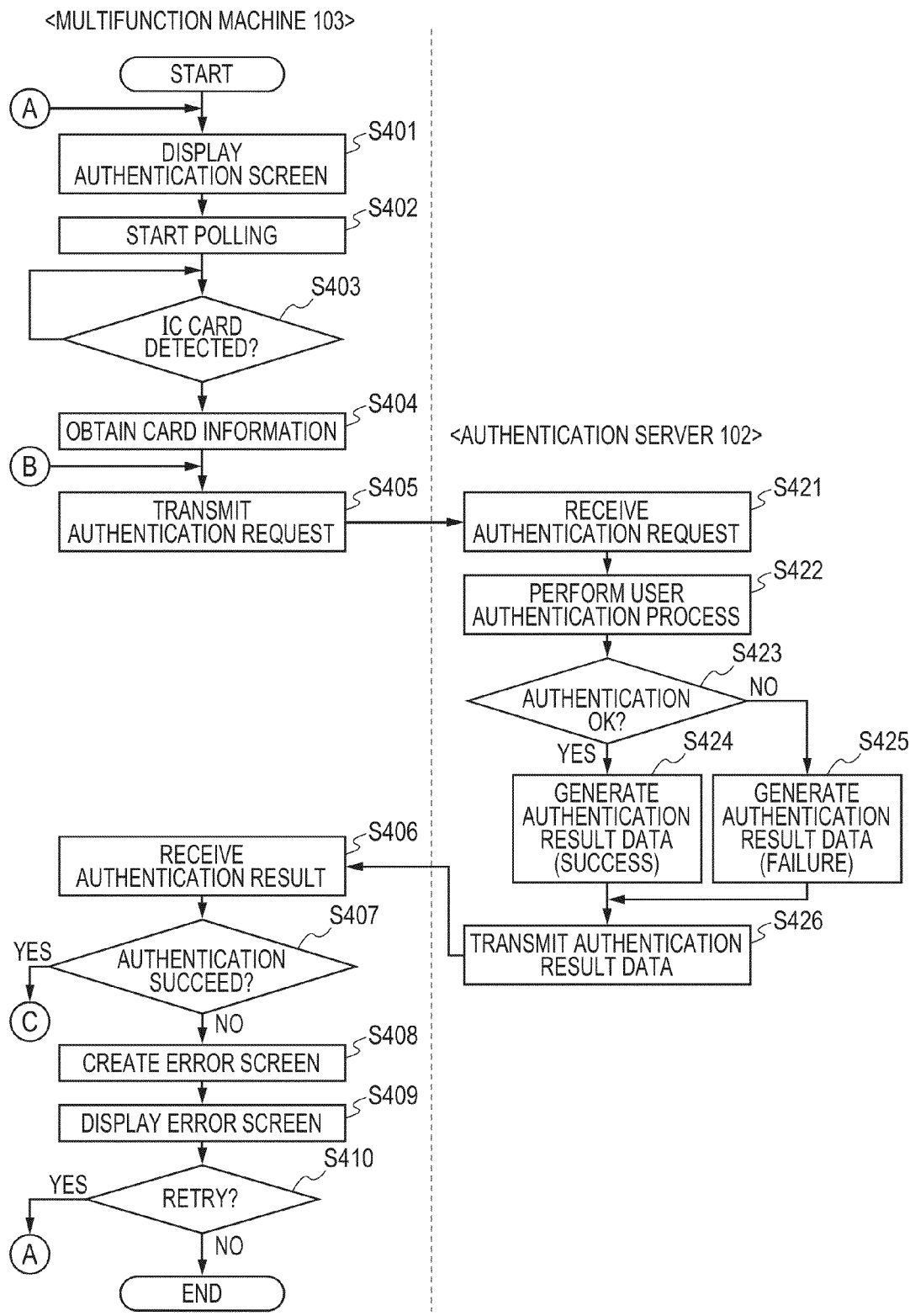
FIG. 4 is a flow chart indicating a user authentication process to be performed by the multifunction machine 103 and the authentication server 102.

It returns to the description of the flow chart in FIG. 4. When the authentication succeeds in the user authentication process of the step S422 (YES in a step S423), authentication result data indicating that the authentication succeeded is generated by the CPU 201 of the authentication server 102 (step S424). Here, the user information made correspondent to the IC card used in the user authentication is included in the authentication result data. Further, when the plurality of IDs (user information) are made correspondent to the IC card (for example, the card information of FIG. 8 has "4fkgods9fmkd" and "skfor3945860"), the user information 802 of all the users made correspondent to the relevant IC card are included in the authentication result data.

On the other hand, when the authentication fails in the user authentication process of the step S422 (NO in the step S423), authentication result data indicating that the authentication failed is generated by the CPU 201 of the authentication server 102 (step S425).

Then, the authentication result data generated in the step S424 or S425 is transmitted to the multifunction machine 103 from which the user authentication request was transmitted (step S426).

When the authentication result data from the authentication server 102 is received (step S406), it is judged by the CPU 301 of the multifunction machine 103 whether the user authentication succeeded or failed on the basis of the authentication result data (step S407). When it is judged that the user authentication succeeded (YES in the step S407), a later-described login user selecting process is performed. The detail of the login user selecting process will be described with reference to FIG. 5.

On the other hand, when it is judged that the user authentication failed (NO in the step S407), the process moves to a step S408 to generate display information for displaying a not-illustrated authentication error screen (step S408). Then, the authentication error screen is displayed according to the generated display information (step S409).

After then, it is judged according to a user's operation instruction whether or not to again perform the user authentication process (RETRY?: step S410). When it is judged to again perform the user authentication process (YES in the step S410), the process moves to the step S401 to repeat the above-described processes.

On the other hand, when it is judged not to again perform the user authentication process (NO in the step S410), the process ends. As above, the user authentication process has been described.

Subsequently, the login user selecting process to be performed by the multifunction machine 103 will be described with reference to FIG. 5.

Initially, the card information obtained in the step S404 of FIG. 4 is stored in the RAM 302 by the CPU 301 of the multifunction machine 103 (step S501). Then, the user information included in the authentication result data received from the authentication server 102 in the step S406 of FIG. 4 is obtained (step S502). At this time, when the plurality of IDs (user information) are included in the authentication result data, all the IDs are obtained. Then, the obtained IDs are stored in the RAM 302.

Subsequently, it is judged according to the user information obtained in the step S502 whether or not the plurality of users have been made correspondent to the IC card used in the user authentication (step S503).

When it is judged that the plurality of users have been made correspondent to the IC card (YES in the step S503), the process moves to a step S504. On the other hand, when it is judged that only one user has been made correspondent to the IC card (NO in the step S503), the user indicated by the user information is determined as the login user (that is, the user who logs in to the multifunction machine), and the process moves to a step S508.

In the step S504, the screen information of the login user selection screen to be used for the login user selection is generated using the user information obtained in the step S502, by the CPU 301 of the multifunction machine 103. Then, a login user selection screen 1100 illustrated in FIG. 11 is displayed in a list format according to the generated screen information (step S505).

Here, the configuration of the login user selection screen to be displayed on the LCD unit of the operation unit 308 of the multifunction machine 103 in the step S505 of FIG. 5 will be described with reference to FIG. 11. Namely, FIG. 11 is the view illustrating an example of the login user selection screen 1100.

As illustrated in FIG. 11, a login user selection section 1101 and a login button 1102 are provided on the login user selection screen 1100.

The login user selection section 1101 is used to accept a designation as to which of users who use the multifunction machine 103 should log in, and the login button 1102 is used to instruct the login by the user selected in the user selection section 1101 to the multifunction machine 103. As above, the login user selection screen 1100 illustrated in FIG. 11 has been described.

Figure 5:
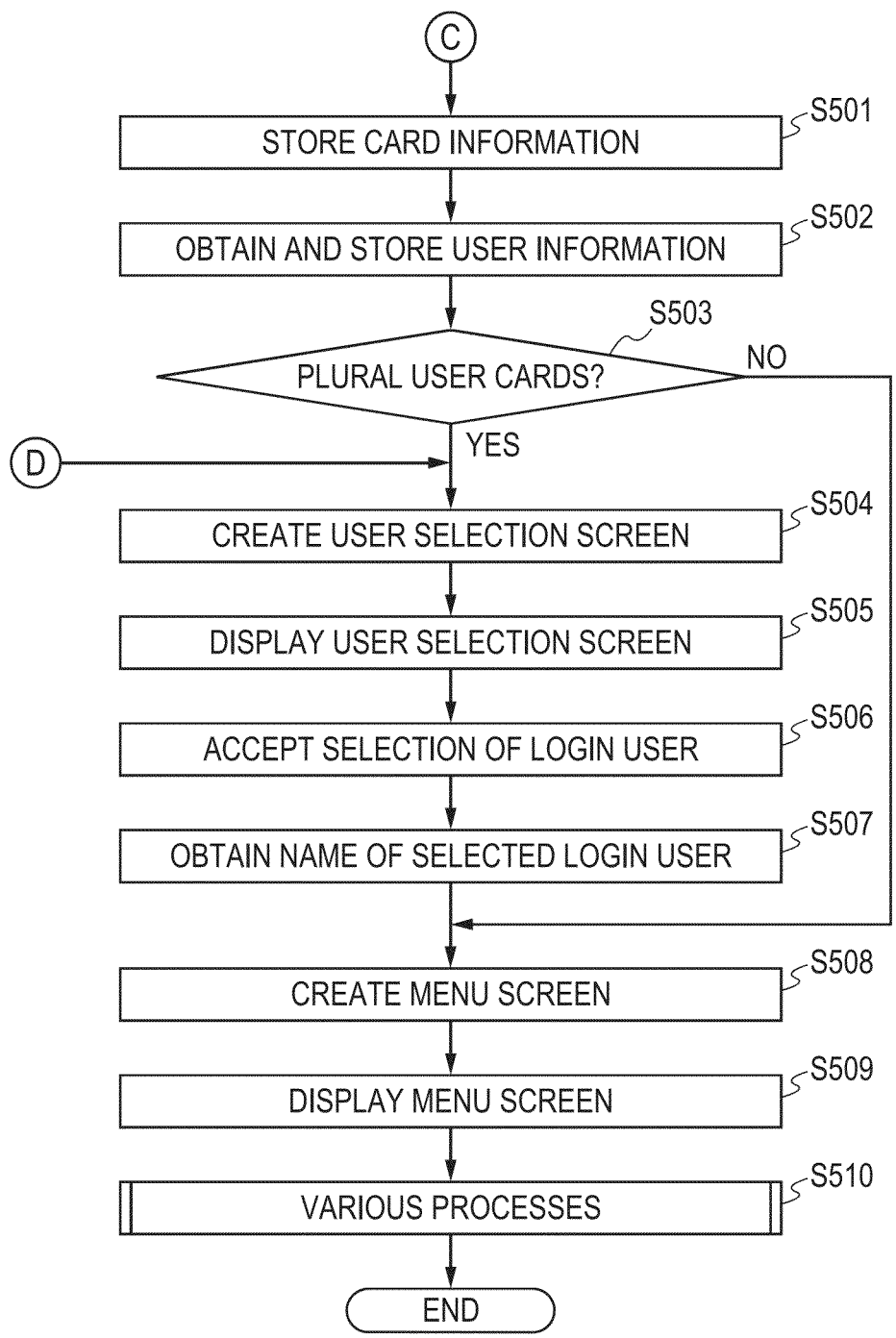
FIG. 5 is a flow chart indicating a login user selecting process to be performed by the multifunction machine 103.

It returns to the description of the flow chart in FIG. 5. When the selection of the login user is accepted by accepting a depression instruction of the login button 1102 after accepting the designation of the login user in the login user selection section 1101 on the login user selection screen 1100 displayed in the step S505 (step S506), a login user name selected in the login user selection section 1101 is obtained (step S507).

Figures 12, 13:
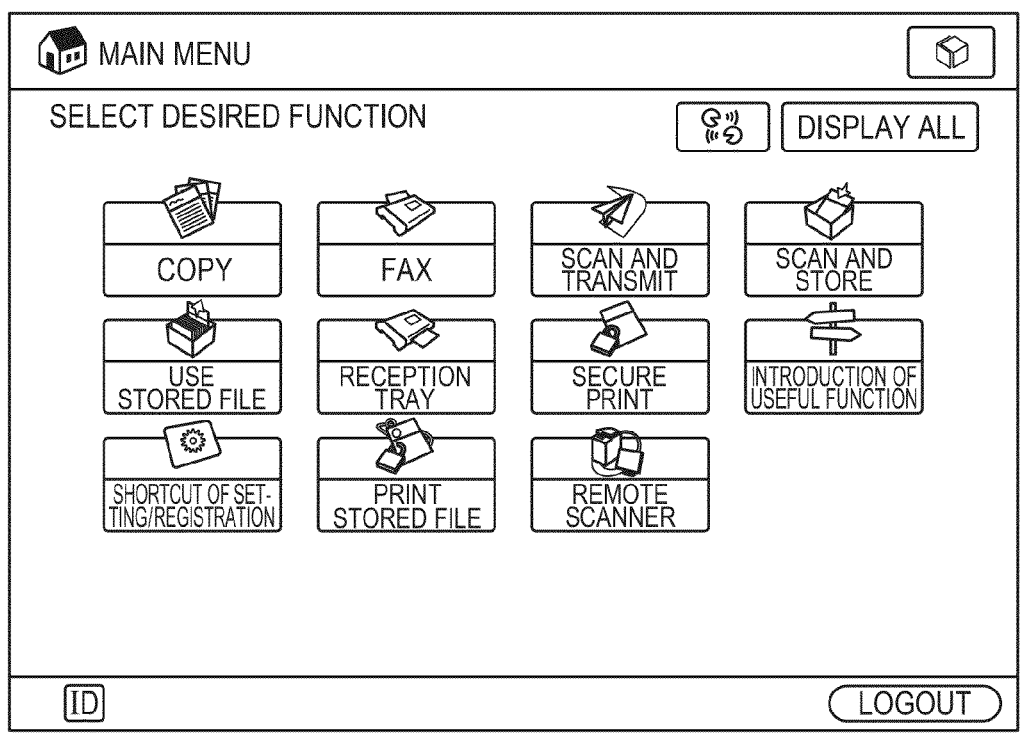
FIG. 12 is a view illustrating an example of a menu screen to be displayed on the LCD unit of the operation unit 308 of the multifunction machine 103.
FIG. 13 is a view illustrating an example of a print instruction screen to be displayed on the LCD unit of the operation unit 308 of the multifunction machine 103.

After the process in the step S507 was performed, or when NO is judged in the step S503, a menu screen 1200 illustrated in FIG. 12 is created (step S508), and the menu screen 1200 is displayed (step S509). After then, various processes are performed (step S510). In any case, the details of the processes to be performed in the step S510 will be later described with reference to FIG. 6.

As above, the login user selecting process to be performed by the CPU 301 of the multifunction machine 103 has been described.

Here, an example of the configuration of the menu screen 1200 to be displayed on the LCD unit of the multifunction machine 103 in the step S509 of FIG. 5 will be described with reference to FIG. 12. As illustrated in FIG. 12, various buttons for inputting various instructions to the CPU 301 are provided on the menu screen 1200.

For example, when the "COPY" button is depressed, a not-illustrated setting screen for performing a copying process is displayed by the CPU 301 of the multifunction machine 103. Thus, various instructions such as the number of copies, a single-sided/double-sided setting, a magnification power and the like are accepted, and then the copying process is actually performed based on the accepted instructions.

The process which should be performed by the multifunction machine 103 is set to each of the buttons on the menu screen. Thus, when an instruction issued by depression of the certain button is accepted, a not-illustrated setting screen of the corresponding process to be performed by the multifunction machine 103 is displayed, and then the process designated according to the input on the displayed setting screen is performed by the CPU 301. As above, the menu screen 1200 illustrated in FIG. 12 has been described.

Subsequently, the details of the various processes to be performed in the step S510 of FIG. 5 will be described with reference to FIG. 6. Here, it should be noted that these processes are performed by the CPU 301 of the multifunction machine 103.

When the login user is selected by the user of the multifunction machine 103 in the login user selecting process in FIG. 5 and the login to the multifunction machine is completed, the menu screen 1200 illustrated in FIG. 12 is displayed. Then, the polling start request is transmitted to the card reader 319, and the polling is started by the card reader 319 (step S601).

Subsequently, when an instruction issued by depression of the "PRINT STORED FILE" button on the menu screen 1200 is accepted, an input of an instruction to print the stored file is accepted (YES in a step S602), and the process moves to a step S603 to perform a stored file printing process. After the stored file printing process is completed, the process returns to the step S602. In any case, the detail of the stored file printing process will be described with reference to FIG. 7.

Here, the detail of the stored file printing process to be performed in the step S603 of FIG. 6 will be described with reference to FIG. 7. It should be noted that the stored file printing process is performed by the CPU 301 of the multifunction machine 103, the CPU 201 of the print server 104, and the CPU 201 of the print management server 105.

When the instruction issued by depression of the "PRINT STORED FILE" button on the menu screen 1200 is accepted, bibliographic information request data including the user information for specifying the user who is logging in to the multifunction machine 103 is transmitted to the print management server 105 by the CPU 301 of the multifunction machine 102. Thus, the bibliographic information of the print data corresponding to the user who is logging in is requested (step S701).

When the bibliographic information request from the multifunction machine 103 is received (step S721), the bibliographic information of the print data corresponding to the user who is logging in to the multifunction machine 103 is obtained from the bibliographic information registered on the bibliographic information data table 900 by the CPU 201 of the print management server 105 (step S722). At this time, even in a case where the plurality of users are made correspondent to the one card, the bibliographic information corresponding to the user other than the user designated at the login time is not obtained. After then, the bibliographic information obtained in the step S722 is transmitted to the multifunction machine 103 from which the bibliographic information request was transmitted (step S723).

Here, a data constitution of a bibliographic information data table stored in the external memory 211 of the print management server 105 will be described with reference to FIG. 9. Namely, FIG. 9 is the view illustrating an example of the data constitution of the bibliographic information data table 900.

As illustrated in FIG. 9, the bibliographic information data table 900 includes a user name 901, a job name 902, the number of prints 903, a storage date and time 904, a print data 905 and the like, as the data items.

The user name 901 is the data item to which the information for specifying the user who requested to store the print data corresponding to the bibliographic information data is registered. The job name 902 is the data item to which the name of the print data is registered. The number of prints 903 is the data item to which the number of prints of the print data is registered.

The storage date and time 904 is the data item to which date and time information indicating the date and time when the print data corresponding to the bibliographic information data is stored in the external memory 211 of any print server 104. A request to delete the print data to which printing is not performed for a certain time after the print data was stored in the print server 104 is transmitted to the print server by the print management server 105, on the basis of the storage date and time information.

The print data 905 is the data item to which path information of the print data corresponding to the bibliographic information data is registered. Thus, it is possible to specify the storage location of the print data based on the path information. As above, the bibliographic information data table 900 has been described.

Figure 7:
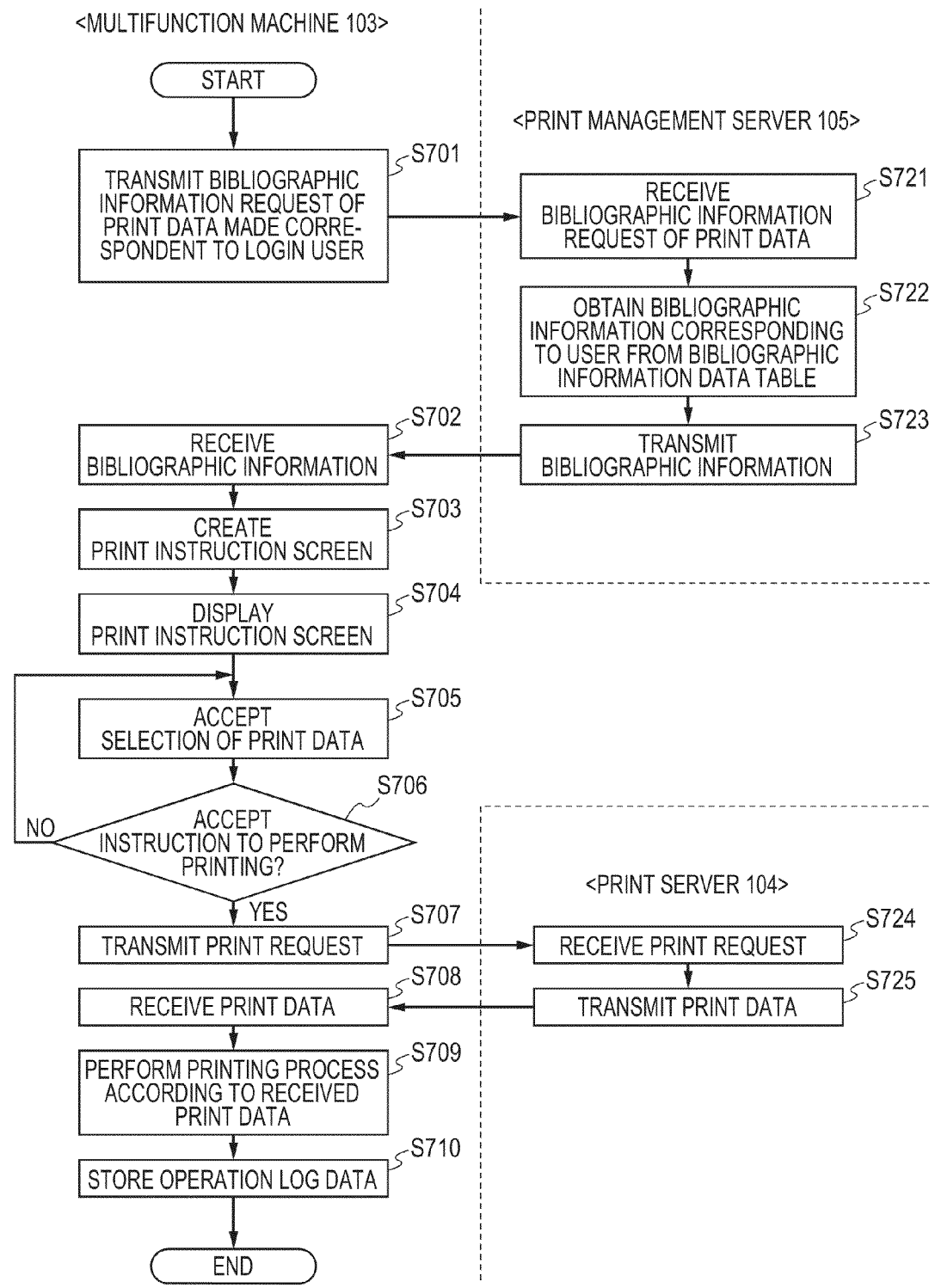
FIG. 7 is a flow chart indicating the detail of a stored file (data) printing process in a step S603 of FIG. 6.

It returns to the description of the flow chart in FIG. 7. When the bibliographic information corresponding to the login user is received from the print management server 105 by the multifunction machine 103 (step S702), a print instruction screen 1300 (FIG. 13) is created based on the received bibliographic information (step S703), and the created print instruction screen 1300 is displayed on the LCD unit of the operation unit 308 (step S704).

Here, the configuration of the print instruction screen to be displayed on the LCD unit of the multifunction machine 103 in the step S704 of FIG. 7 will be described with reference to FIG. 13. Namely, FIG. 13 is the view illustrating an example of the print instruction screen 1300.

As illustrated in FIG. 13, a print data display section 1301 and a pint button 1302 are provided on the print instruction screen 1300.

The print data display section 1301 is the control section for displaying the bibliographic information of the print data corresponding to the login user, stored in the print server 104, and for accepting the designation of the print data to be printed.

More specifically, a data selection/non-selection display section 1301-1, a document name display section 1301-2, a storage date and time display section 1301-3, and the number of copies display section 1301-4 are set in the print data display section 1301.

The data selection/non-selection display section 1301-1 is to display the information indicating whether the print data has been selected as the print target (box is checked) or not (box is not checked). When an instruction issued by depression for the print data being selected is accepted, such a selected state is released and thus a non-selected state is set. On the other hand, when an instruction issued by depression for the print data being not selected is accepted, a selected state is set.

Besides, the document name display section 1301-2 is to display the information registered in the document name 902 of the bibliographic information, the storage date and time display section 1301-3 is to display the information registered in the storage date and time 904 of the bibliographic information, and the number of copies display section 1301-4 is to display the information registered in the number of prints 903 of the bibliographic information.

When an instruction issued by depression of the print button 1302 is accepted when any print data is being selected, the selected print data is actually printed. As above, the print data selection screen 1300 has been described.

It returns to the description of the flow chart in FIG. 7. After the print data selection screen 1300 was displayed in the step S704, selection of the print data to be printed is accepted by the operation instruction to the print data selection screen 1300 (step S705). Then, when an instruction to print the print data is accepted in response to the depression of the print button 1302 (YES in a step S706), a request to print the print data specified by the storage date and time 904 in the bibliographic information is issued (step S707).

When the request to print the print data is received by the print server 104 (step S724), the print data is transmitted to the multifunction machine 103 in response to the received request (step S725). Incidentally, the request to print the print data may be issued through the print management server 105.

Then, when the print data is received from the print server 104 (step S708), the printing process according to the received print data is performed by the multifunction machine 103 (step S709). Subsequently, operation log data concerning the printing process is registered on a not-illustrated operation log management table, while the operation log data is made correspondent to the login user (step S710). Thus, by using the operation log data registered on the operation log management table, it is possible to confirm how much each user has progressed the printing process using the multifunction machine 103. As a result, it is possible to calculate the charge of the fee concerning the use of the multifunction machine 103 in regard to each section, each project or the like. As above, the details of the stored data printing process in the step S603 of FIG. 6 have been described.

Figure 6:
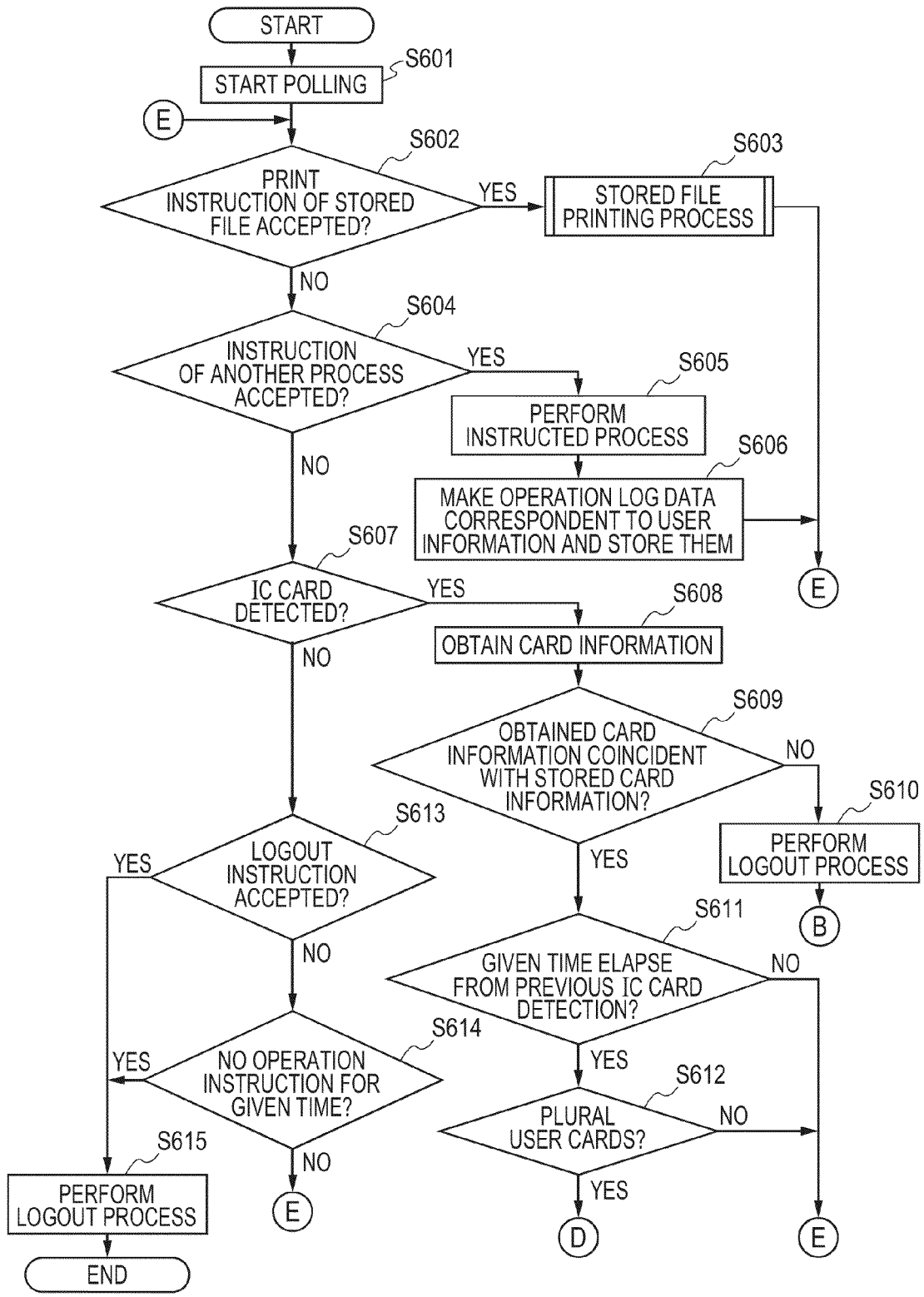
FIG. 6 is a flow chart indicating the details of various processes in a step S510 of FIG. 5.

It returns to the description of the flow chart in FIG. 6. In a case where it is judged in the step S602 that the instruction to print the stored file is not accepted, when an instruction to perform another process (e.g., a copying process, a facsimile process, a scanning and transmitting process, or the like) is accepted through the menu screen 1200 (YES in a step S604), the instructed process is performed (step S605). Then, operation log data concerning the performed process is registered on a not-illustrated operation log management table, while the operation log data is made correspondent to the login user (step S606). Subsequently, the process moves to the step S602.

In a step S607, it is detected by the CPU 301 of the multifunction machine 103 whether or not the IC card was passed over the card reader 319. When it is detected that the IC card was passed over the card reader, the process moves to a step S608 to obtain the card information read by the card reader 319. Then, it is judged whether or not the card information obtained in the step S608 is coincident with the card information registered and stored in the RAM 302 in the step S501 of FIG. 5 (step S609).

When it is judged in the step S609 that the card information registered and stored in the RAM 302 in the step S501 is not coincident with the card information obtained in the step S608, that is, when it is judged that the IC card which is different from the IC card used in the login process of the user who is logging in is passed over the card reader 319 (NO in the step S609), the process moves to a step S610 to perform the logout process for the user who is logging in. Then, the process moves to the step S405 in FIG. 4 to generate the authentication request data including the card information obtained in the step S609 of FIG. 6 and transmit the generated authentication request data to the authentication server, thereby requesting the user authentication using the obtained IC card information to the authentication server 102. The subsequent processes are the same as those already described as above.

On the other hand, when it is judged in the step S609 that the card information registered and stored in the RAM 302 in the step S501 is coincident with the card information obtained in the step S608, that is, when it is judged that the IC card which is the same as the IC card used in the login process of the user who is logging in is passed over the card reader 319, it is further judged whether or not a predetermined (or given) time elapses after the detection of the relevant IC card (step S611). Such a judging process is performed for preventing that a re-selecting process of the login user is performed while the card is being passed over the card reader 319.

When it is judged in the step S611 that the predetermined time elapses after the detection of the relevant IC card (YES in the step S611), the process moves to a step S612 to further judge based on the number of the user information stored in the RAM 302 in the step S502 of FIG. 5 whether or not the relevant IC card is the IC card which has been made correspondent to the plurality of users. Then, when it is judged that the relevant IC card is the IC card made correspondent to the plurality of users (YES in the step S612), the process moves to the step S504 in FIG. 5 to display the login user selection screen 1100 on the LCD unit, thereby accepting the selection of the login user. At this time, on the login user selection screen, a character color, a background color and the like may be changed for the user who is logging in so as to make display of the relevant user different from display of other users. Here, when the user different from the user who is logging in is selected in the subsequent step S506, the logout process is performed to the user who is logging in, and then the login process is performed to the user newly selected.

When NO is judged by the CPU 301 in the step S611 or S612, the process moves to the step S602 to perform the subsequent processes.

Further, it is judged in a step S613 whether or not a logout instruction input by accepting a depression instruction of the logout button on the menu screen 1200 is accepted. When it is judged that logout instruction is accepted (YES in the step S613), the process moves to a step S615 to perform the logout process. Also, when it is judged that an operation instruction is not accepted for a predetermined (or given) time while the user is logging in (YES in a step S614), the logout process is performed.

In the present invention, in the case where the plurality of users are made correspondent to the IC card, after any one of the users is selected from the plurality of users and the login process is performed to the selected user, when the user who is logging in is changed over to another user also made correspondent to the same IC card, the relevant IC card is still required.

Further, one object for performing the stored data printing process as shown in FIG. 7 is to ensure the security of the print data. In the present invention, as described above, the IC card is necessary to change over the user who is logging in. Thus, for example, even if a user who is logging in forgot the logout and left from the multifunction machine, another user cannot print the print data other than the print data of the user who is logging in, whereby it is possible to assure certain security to the print data.

Moreover, in the present invention, when the user who is logging in is changed over, it does not always have to perform the logout process for the user who is logging in, whereby it is possible to save user's efforts.

As described above, it is needless to say that the object of the present invention can be achieved in a case where the storage medium storing a program to achieve the functions of the above embodiment is supplied to a system or an apparatus and then a computer (or CPU or MPU) in the system or the apparatus reads and executes the program stored in the storage medium.

In this case, the program itself read from the storage medium achieves the new functions of the present invention, whereby the storage medium of storing the program constitutes the present invention.

Here, as the storage medium for supplying the program, for example, a flexible disk, a hard disk, an optical disk, a magnetooptical disk, a CR-ROM, a CD-R, a DVD-ROM, a magnetic tape, a nonvolatile memory card, a ROM, an EEPROM, a silicon disk or the like can be used.

Moreover, it is needless to say that the present invention includes not only a case where the functions of the above embodiment are achieved by executing the program read by the client apparatus 101, the authentication server 102, the multifunction machine 103, the print server 104 and the print management server 105, but also a case where an OS (operating system) or the like functioning on a computer performs a part or all of the actual process according to instructions of the program, whereby the functions of the above embodiment are achieved by the relevant process.

Moreover, it is needless to say that the present invention includes a case where the program read from the storage medium is once written in a memory provided in a function expansion board inserted in the computer or a function expansion unit connected to the computer, and then a CPU or the like provided in the function expansion board or the function expansion unit performs a part or all of the actual process according to the instructions of the program, whereby the functions of the above embodiment are achieved by the relevant process.

Moreover, the present invention may be applied to a system consisting of a plurality of devices, or to an apparatus comprising a single device. Moreover, it is needless to say that the present invention can be applied to even a case where the functions of the above embodiment are achieved by supplying the program to the system or the apparatus. In this case, the system or the apparatus can have the effect of the present invention by reading out the content of the storage medium of storing the program to achieve the present invention to the system or the apparatus.

Moreover, when the program for achieving the present invention is downloaded and read from a server, a database or the like on a network by a communication program, the system or the apparatus can have the effect of the present invention. Incidentally, it should be noted that the above embodiments and their modifications are all included in the present invention.

Moreover, each process executed by such software as described above can be achieved by each means using a firmware constitution or a hardware constitution. In this connection, the technical scope of the present invention also includes the firmware constitution or the hardware constitution like this.

While the present invention has been described with reference to the exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-212090, filed Sep. 22, 2010, which is hereby incorporated by reference herein in its entirety.

What is claimed is:

1. An image processing apparatus comprising:
   at least one central processing unit configured to function as an obtaining unit that obtains a first identification information from a first integrated circuit card;
   a storage unit that stores the first identification information obtained by the obtaining unit;
   a displaying unit that displays, in a case where the first identification information obtained by the obtaining unit corresponds to plural items of user information, a selection screen for selecting one of the plural items of user information;
   an accepting unit that accepts selection of user information from among the plural items of user information on the selection screen;
   a login unit that executes a login using the user information selected on the selection screen;
   a determination unit that determines, in a case where the obtaining unit obtains a second identification information from the first integrated circuit card or from a second integrated circuit card during the login using the user information selected on the selection screen, whether or not the second identification information obtained by the obtaining unit matches the first identification information stored in the storage unit;
   a controlling unit that causes the displaying unit to display again the selection screen for selecting one of the plural items of user information, in a case where the determination unit determines that the second identification information obtained by the obtaining unit matches the first identification information stored in the storage unit; and
   a logout unit that executes a logout using user information, wherein
   in a case where different user information is selected on the selection screen when it is again displayed by the displaying unit, the logout unit executes the logout using the user information selected when the selection screen was displayed for the first identification information, the login unit executes a login using the different user information, and the first identification information includes identification information to identify the first integrated circuit card and the second identification information includes identification information to identify the integrated circuit card on which the second identification information is stored.

2. The image processing apparatus according to claim 1, wherein, in a case where the second identification information is obtained before a predetermined time elapses, the controlling unit controls the displaying unit not to display the selection screen.

3. The image processing apparatus according to claim 1, further comprising a request unit configured to request an authentication process to an authentication apparatus on the basis of the obtained first identification information,
   wherein, in a case where the determination unit determines that the second identification information obtained by the obtaining unit does not match the first identification information stored in the storage unit, the controlling unit causes the request unit to request the authentication process, and
   wherein, in the case where the determination unit determines that the second identification information obtained by the obtaining unit matches the first identification information stored in the storage unit, the controlling unit causes the request unit not to request the authentication process.

4. The image processing apparatus according to claim 1, wherein the controlling unit causes the displaying unit to display the selection screen in a case where the obtaining unit obtains the second identification information after a predetermined time elapsed during the login using the user information.

5. The image processing apparatus according to claim 1, further comprising a printing unit configured to print data corresponding to the selected user information.

6. A controlling method of an image processing apparatus, comprising:
   obtaining a first identification information from a first integrated circuit card;
   storing the obtained first identification information in a storage unit; displaying, in a case where the obtained first identification information corresponds to plural items of user information, a selection screen for selecting one of the plural items of user information, on a displaying unit;
   accepting selection of user information from among the plural items of user information on the selection screen;
   executing a login using the user information selected on the selection screen; determining, in a case where a second identification information is obtained from the first integrated circuit card or from a second integrated circuit card during the login using the user information selected on the selection screen, whether or not the obtained second identification information matches the first identification information ID stored in the storage unit;
   controlling the displaying unit to again display the selection screen for selecting one of the plural items of user information, in a case where it is determined that the obtained second identification information matches the first identification information stored in the storage unit; and
   executing a logout using user information,
   wherein
   in a case where different user information is selected on the selection screen when it is again displayed by the displaying unit, the logout step executes the logout using the user information selected when the selection screen was displayed for the first identification information, the login step executes a login using the different user information, and the first identification information includes identification information to identify the first integrated circuit card and the second identification information includes identification information to identify the integrated circuit card on which the second identification information is stored.

7. A storage medium for storing a program to perform the controlling method as described in claim 6.

* * * * *